United States Patent [19]

Yagi et al.

[11] 3,941,105

[45] Mar. 2, 1976

[54] EXHAUST GAS RECIRCULATION FOR THREE-VALVE ENGINE

[75] Inventors: Shizuo Yagi, Asaka; Urataro Asaka, Kamifukuoka, both of Japan

[73] Assignee: Honda Giken Kogyo Kabushiki Kaisha, Tokyo, Japan

[22] Filed: Nov. 8, 1973

[21] Appl. No.: 413,969

[52] U.S. Cl. ....... 123/119 A; 123/32 ST; 123/75 B; 123/127
[51] Int. Cl.² ...................................... F02M 25/06
[58] Field of Search .......... 123/119 A, 32 ST, 32 C, 123/32 SP, 48 D, 75 B, 191 S, 191 P, DIG. 4

[56] References Cited
UNITED STATES PATENTS

| | | | |
|---|---|---|---|
| 3,294,073 | 12/1966 | Bressan | 123/119 A |
| 3,408,992 | 11/1968 | Von Seggern et al. | 123/32 ST |
| 3,612,020 | 10/1971 | Moulds | 123/119 A |
| 3,633,553 | 1/1972 | Holzapfel | 123/119 A |
| 3,799,130 | 3/1974 | Dahlstrom | 123/119 A |
| 3,809,039 | 5/1974 | Alquist | 123/119 A |

*Primary Examiner*—Charles J. Myhre
*Assistant Examiner*—David D. Reynolds
*Attorney, Agent, or Firm*—Lyon & Lyon

[57] ABSTRACT

A three-valve stratified-charge internal combustion piston engine has an auxiliary combustion chamber connected to each main combustion chamber through a torch nozzle. A rich mixture is supplied to the auxiliary chamber and a lean mixture is supplied to the main chamber. A portion of the exhaust gases from the main chamber is recirculated through a control valve to mix with the rich mixture supplied to the auxiliary chamber. For loaded conditions of the engine, additional exhaust gases from the main chamber are recirculated through a control valve to mix with the lean mixture supplied to the main chamber. The control valves are automatically operated by means responsive to engine operating conditions.

17 Claims, 2 Drawing Figures

EXHAUST GAS RECIRCULATION FOR THREE-VALVE ENGINE

This invention relates to internal combustion piston engines of the spark-ignition type having a main combustion chamber and an auxiliary combustion chamber connected through a torch nozzle restriction. A rich mixture ignited in the auxiliary combustion chamber projects a flame through the torch nozzle restriction to ignite the lean mixture in the main combustion chamber. An engine of this type is shown in the copending application of Date et al. Ser. No. 353,786 filed Apr. 23, 1973, now U.S. Pat. No. 3,890,942 granted June 24, 1975.

More specifically, this invention relates to a method and apparatus for reducing the amount of $NO_x$ (nitrogen oxides) in the engine exhaust gases discharged to the atmosphere. This reduction of $NO_x$ is accomplished by lowering of the peak temperature reached during the combustion process in the engine, and this in turn is achieved by recycling exhaust gas through the auxiliary combustion chamber during certain engine operating conditions, and recycling exhaust gas through both the auxiliary combustion chamber and main combustion chamber during other engine operating conditions.

Conventional engines which do not utilize an auxiliary combustion chamber and a torch nozzle restriction commonly recirculate exhaust gas into the combustion chamber along with the air-fuel mixture, to reduce $NO_x$ emissions. However, in order to obtain any substantial reduction in $NO_x$ discharged into the atmosphere, a very large amount of recirculating exhaust gas is required. As a result thereof, such engines characteristically are penalized by lowered power output, greater fuel consumption, and an increase in the objectionable emissions of carbon monoxide (CO) and unburned hydrocarbons (HC).

In accordance with the present invention, $NO_x$ emissions are substantially decreased without any corresponding increase of CO and HC emissions in the exhaust gases, over a wide range of engine operations. This is accomplished by introducing only a small amount of exhaust gases from the main chamber to mix with the rich mixture supplied to the auxiliary combustion chamber. For much of the operating range of the engine, exhaust gas is recirculated only through the relatively small auxiliary combustion chamber. For other engine operating conditions, exhaust gas is recirculated into both the auxiliary combustion chamber and the main combustion chamber.

It is known that the formation of $NO_x$ is substantially affected by the air-fuel ratio immediately before ignition, the amount of inherent residual exhaust gases in the mixture, and the amount of exhaust gas from recirculation. Also, it has been found that, in an engine of the type described and operated with an overall mixture leaner than stoichiometric, $NO_x$ is formed in that part of the burning mixture which has an intermediate air-fuel ratio resulting from mixing the rich mixture and lean mixture in the stratified charge. In order to minimize $NO_x$ formation the percentage of exhaust gases contained in the rich mixture charged into the auxiliary chamber is controlled so that the percentage is always larger than that of exhaust gases in the main chamber mixture. It is an important feature of the present invention that the exhaust gas recirculation be made principally into the auxiliary combustion chamber, in order to reduce the formation of $NO_x$.

When the engine is operating at low load and low temperature, the recirculation of exhaust gas is substantially cut off since the formation of $NO_x$ is small under these conditions. When the engine is operating under moderate load, the amount of exhaust gas recirculation is increased in accordance with the engine load. For higher engine loads, and particularly near full load, the amount of exhaust gas recirculation is decreased. During acceleration, exhaust gas recirculation is increased at a slow rate in order to maintain driveability. During deceleration, exhaust gas recirculation may be substantially cut off temporarily to prevent an increase of HC and CO in the exhaust gases discharged into the atmosphere.

Other and more detailed objects and advantages will appear hereinafter.

Figure 1:
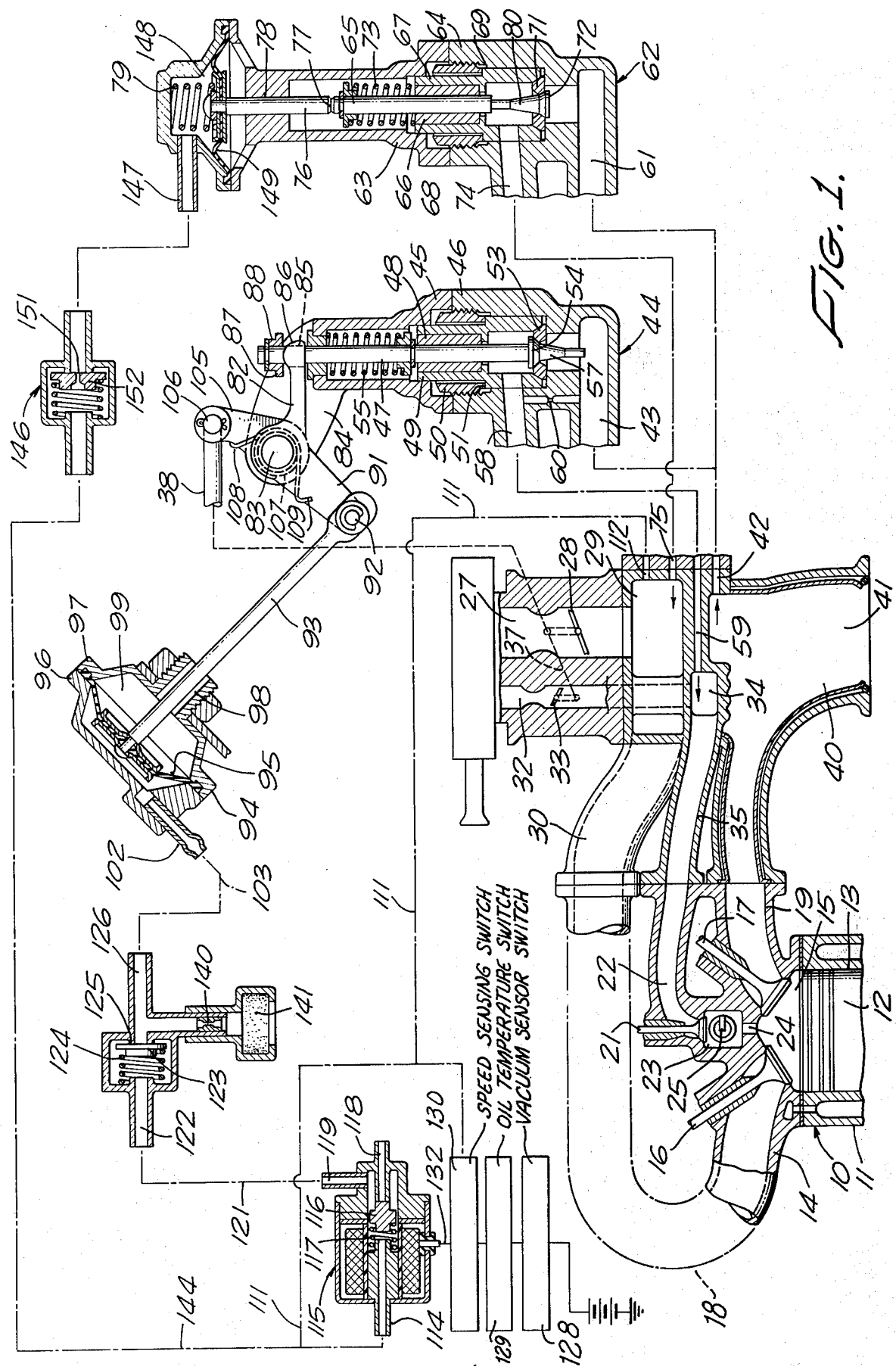
FIG. 1 is a sectional elevation showing a three-valve engine of the type described and illustrating mechanism for regulating exhaust gas recirculation to the auxiliary combustion chamber and to the main combustion chamber, together with apparatus for changing the amounts of such recirculations in accordance with engine driving conditions.

Referring to the drawings, the automobile engine generally designated 10 includes a stationary block 11 having one or more pistons 12 each mounted to reciprocate within a cylinder 13 provided in the block 11. Although only one piston and cylinder are shown in the drawings, it will be understood that a greater number may be employed in the engine. Each cylinder 11 cooperates with its piston 12 and with the engine head 14 to define a main combustion chamber 15 having an intake valve 16 and an exhaust valve 17. The intake valve 16 controls flow through the intake passage 18 and the exhaust valve 17 controls flow of exhaust gases from the main chamber 15 through the exhaust passage 19. A "third" valve 21 controls flow through the auxiliary intake passage 22 to the auxiliary chamber 23 provided in the engine head 14. The auxiliary chamber 23 is connected by the torch nozzle restriction 24 to the main combustion chamber 15. A spark plug 25 is positioned to ignite a gaseous mixture in the auxiliary combustion chamber 23. All three valves 16, 17 and 21 are operated by conventional cam mechanism, not shown.

A first carburetor 27 has a throttle valve 28 regulating the flow of lean air-fuel mixture to the riser chamber 29 and to the main intake manifold 30. Similarly, a second carburetor 32 has a throttle valve 33 regulating the flow of rich air-fuel mixture to the riser chamber 34 and to the auxiliary intake manifold 35. The action of the throttle valves 28 and 33 is coordinated through suitable mechanism 37 and both throttle valves are operated by the throttle rod 38 which is connected to the accelerator pedal, not shown. Exhaust gases form the passage 19 enter the exhaust chamber 40, and the major portion of the exhaust gases pass through the exit opening 41 to an exhaust pipe and muffler assembly, not shown.

In accordance with this invention, hot exhaust gases are withdrawn from the exhaust chamber 40 through port 42 into inlet passageway 43 in the control valve assembly generally designated 44. This valve assembly has a stationary body formed of two parts 45 and 46 secured together by suitable fastenings, not shown. A movable valve stem 47 is guided for sliding axial movement within a bushing 48 carried on a sleeve 49. This sleeve 49 is fixed within the body portion 46 by means of the threaded nut 50 which engages the shoulder 51. A stationary valve seat 53 is clamped in place within the body portion 46 by the sleeve 49 and this seat is engaged by a valve head surface 54 to prevent flow through the seat 53. A coil compression spring 55 within the body part 45 acts on the valve stem 47 in a direction to close the valve face 54 against the stationary seat 53. A taper surface 57 on the valve stem 47 below the face 54 serves to regulate flow from the inlet passageway 43 through the stationary seat 53 and out through the discharge passageway 58. The passageway 58 is connected through passage 59 to the riser chamber 34 and to the auxiliary intake manifold 35 which carries the rich mixture to the auxiliary chamber 23. From this description it will be understood that, when the valve stem 47 is lifted to permit flow through the stationary seat 53, exhaust gases from the exhaust chamber 40 are caused to flow in quantity into the auxiliary intake manifold 35 to mix with rich mixture supplied to the auxiliary chamber 23.

A by-pass orifice 60 is provided between the inlet passageway 43 and the discharge passageway 58 so that a very small quantity of exhaust gases may flow into the auxiliary chamber 23, even when the engine is idling, and the valve 53–54 is closed.

Hot exhaust gases may also be withdrawn from the exhaust chamber 40 through port 42 into inlet passageway 61 in the control valve assembly generally designated 62. This valve assembly 62 has a stationary body formed of two parts 63 and 64 secured together by suitable fastenings, not shown. The movable valve stem 65 is guided for sliding axial movement within a bushing 66 carried on a sleeve 67. This sleeve 67 is fixed within the body portion 64 by means of the threaded nut 68 which engages the shoulder 69. A stationary valve seat 71 is clamped in place within the body portion 64 by the sleeve 67 and this seat is engaged by a valve head surface 72 to prevent flow through the seat 71. A coil compression spring 73 within the body part 63 acts on the valve stem 65 in a direction to close the valve face 72 against the stationary seat 71. A taper surface 80 on the valve stem 65 above the face 72 serves to regulate flow from the inlet passageway 61 through the stationary seat 71 and out through the discharge passageway 74. The passageway 74 is connected through port 75 to the riser chamber 29 and to the main intake manifold 30 which carries the lean mixture to the main combustion chamber 15.

If desired, the upper portion 76 of the valve stem 65 may be formed as a separate part, having its lower end 77 in contact with the upper end of the valve stem 65. The upper stem portion 76 is slidably guided for axial movement within the bore 78 in the upper body part 63, and the two parts 65 and 76 are maintained in end-to-end contact by means of the springs 73 and 79. The purpose of this two-part construction is to minimize problems of alignment between the bore of the bushing 66 and the bore 78. From this description it will be understood that, when the stem 65 is depressed to permit flow through the stationary seat 71, exhaust gases from the exhaust chamber 40 are caused to flow into the main intake manifold 30 to mix with the lean mixture supplied to the main combustion chamber 15.

Means are provided for operating the stem 47 of the control valve 44, and as shown in the drawings this means includes a lever arm 82 mounted to turn about a stationary pin 83 carried on a support arm 84 fixed to the upper body part 45. The arm 82 has an opening 85 which loosely receives the upper projecting end of the valve stem 47. A rounded portion 86 on the arm engages under a shoulder 87 formed on the collar 88, which is fixed to the valve stem 47. From this description it will be understood that, when the arm 82 turns in a counterclockwise direction about the pin 83, the valve stem 47 is moved upward against the action of the spring 55 to permit flow through the valve seat 53.

An arm 91 is formed integrally with the arm 82 and turns about the pin 83. This arm 91 is pivotally connected at 92 to the rod 93 extending from the vacuum operated device 94. The rod 93 is fixed to the central portion of a flexible diaphragm 95, and the peripheral edge of the diaphragm 95 is clamped between body parts 96 and 97. The rod 93 extends through an opening 98 in the body part 94 which opening places the chamber 99 in communication with the atmosphere. The vacuum chamber 101 defined between the flexible diaphragm 95 and the upper body part 96 is connected through fitting 102 to the vacuum line 103. When vacuum pressure is supplied through line 103 to vacuum chamber 101, the rod 93 is tensioned to cause the arm 82 to move in a clockwise direction to the limit of its angular travel, permitting the coil spring 55 to close the valve face 54 against the stationary seat 53, thereby preventing recirculation of exhaust gas to the auxiliary chamber 23.

An arm 105 is mounted to turn about the axis of the stationary pin 83. This arm 105 is pivotally connected at 106 to the throttle rod 38. A torsion spring 107 has one end 108 secured to the arm 105 and the other end 109 secured to the arm 91. Accordingly, when the rod 93 is in the position shown in FIG. 1, movement of the throttle rod 38 toward the left causes the arm 105 to move in a counterclockwise direction against the action of the torsion spring 107, but the arm 82 does not move because it is held in position by the rod 93. When the intensity of the vacuum in the chamber 101 is lessened, the rod 93 may be moved by force applied from the throttle rod 38 through the torsion spring 107 to cause the arm 82 to move in a counterclockwise direction, thereby lifting the valve stem 47 to open the valve and permit recycling of exhaust gas into the auxiliary manifold 35 and into the auxiliary combustion chamber 23.

The rate of flow of recycle gas through the stationary seat 53 depends upon the shape of the surface 57 and the axial position of the valve stem 47.

It is desirable that vacuum pressure be supplied to the vacuum operator device 94 only when one or more of the following conditions exist: (a) the ground speed of the automobile is below about 20 kilometers per hour, (b) the lubricating oil temperature in the engine is below about 45° C, and (c) the vacuum pressure in the manifold 30 is above about 400 millimeters of mercury. Accordingly, the vacuum pressure line 111 connected to port 112 communicating with the riser chamber 29 leads to the inlet 114 of the solenoid valve assembly 115.

Before electrical energy is applied to the solenoid valve assembly 115, the armature 116 is positioned by the spring 117 to close the vent 118 and to establish communication between the inlet 114 and the outlet 119. The outlet 119 of the solenoid valve 115 is connected by line 121 to the inlet 122 to the spring loaded check valve 123. Suction pressure moves the valve 123 against the spring 124 and away from the stationary seat 125, and the suction pressure is supplied through passage 126 and line 103 and inlet 102 to the suction chamber 101 of the operator 94.

Electrical energy is only supplied to the solenoid valve 115 in the event that the speed-sensing switch 128, the oil temperature switch 129 and the vacuum sensor switch 130 are all closed, in order in complete the circuit through electrical line 132 to the solenoid valve 115. The switches 128, 129 and 130 are in series and are of conventional design and construction. Accordingly, under startup conditions, the solenoid valve 115 remains in the position shown in FIG. 1 until the lubricating oil temperature reaches about 45° C, the automobile reaches a speed of at least 20 kilometers per hour, and the manifold vacuum pressure does not exceed about 400 millimeters of mercury.

When the engine 10 is operating under sufficient load, the suction pressure in the intake manifold falls below about 400 millimeters of mercury, and when the switches 128 and 129 are closed, the solenoid valve assembly 115 operates to shut off vacuum pressure in the line 121. A bleed orifice 140 permits atmospheric air to pass through the filter 141 to enter the passage 126 and thereby gradually reduce the intensity of the vacuum pressure in the chamber 101. After a time delay, this balances the pressure on both sides of the flexible diaphragm 95.

During this time delay interval, the throttle rod 38 acting through the torsion spring 107, against any remaining tension force in the rod, may then cause arm 82 to lift the stem 47 to open the control valve parts 53–54. The restricted orifice 140 thus provides a means of insuring slow opening movement of the control valve 44.

In the event that the throttle rod 38 should move suddenly in a direction to cause deceleration of the engine, the arm 91 moves the rod 93 in a direction to reduce the size of the vacuum chamber 101. Gas in the chamber 101 is then vented through line 103, passage 126, spring loaded check valve 123, pipe 122, line 121, passage 119 and passage 118 to atmosphere. If the extent of movement of the throttle rod 38 corresponds to return of the throttle valves 28 and 33 near to idle position, creating high vacuum pressure in the intake manifold, then the solenoid armature 116 moves to the position shown in FIG. 1 and the vacuum chamber 101 is vented to the suction line 111. The control valve 44 thus closes promptly during deceleration, and this minimizes the production of unwanted CO and HC emissions in the exhaust gases of the engine.

The vacuum branch line 144 is also connected through check valve assembly 146 to the inlet pipe 147 leading to the vacuum space 148 above the flexible diaphragm 149 connected to stem part 76 of the control valve 62. A restricted orifice 151 in the check valve part 152 permits gradual reduction of intensity of vacuum pressure in the diaphragm chamber 148 in order to prevent too rapid opening of the control valve under the action of the heavy spring 79.

Figure 2:
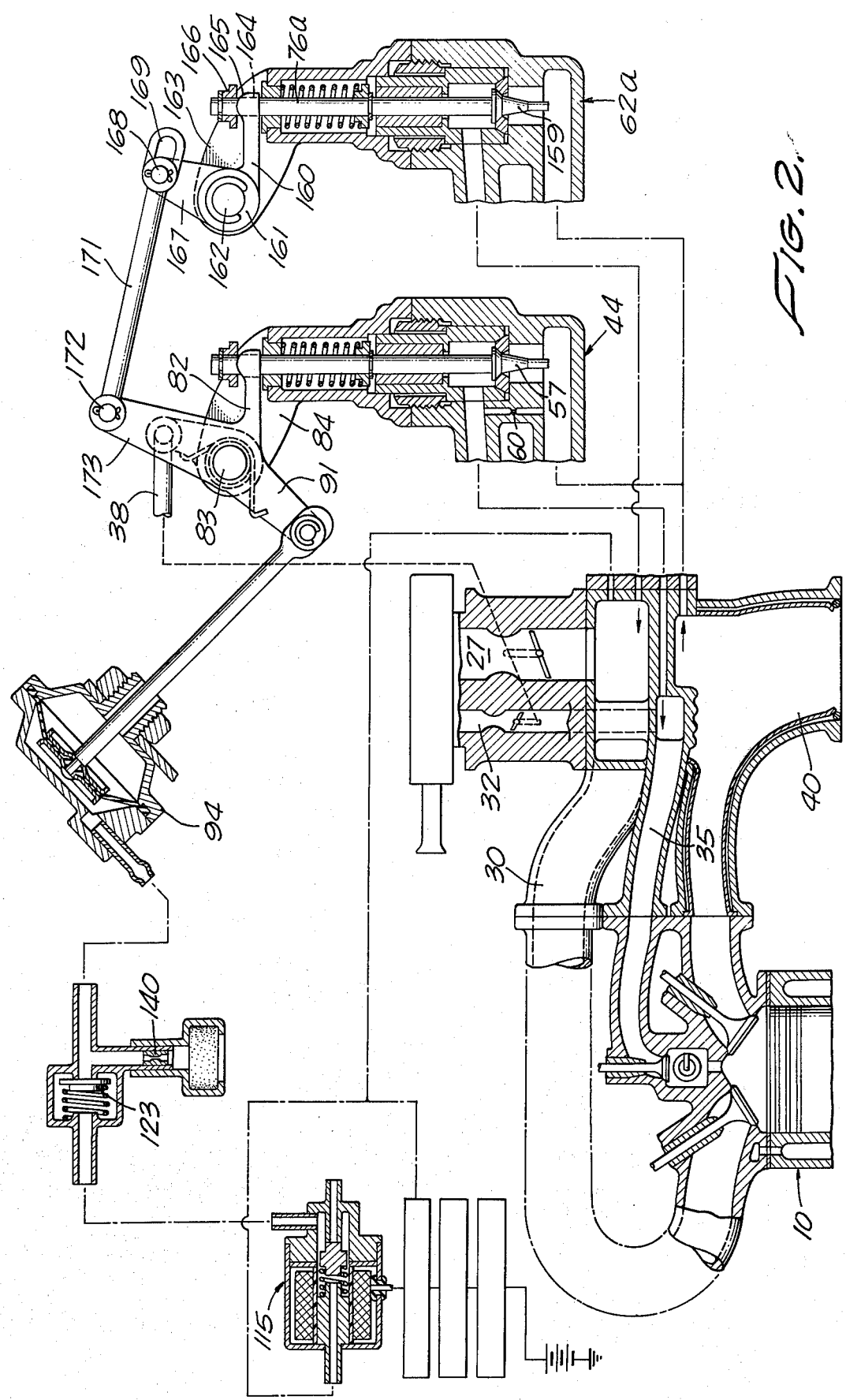
FIG. 2 is similar to FIG. 1, showing modified operating means for the valve which controls exhaust gas recirculation into the main combustion chamber.

In the modified form of the invention shown in FIG. 2, the engine 10, manifolds 30 and 35, carburetors 27 and 32, and exhaust chamber 40 and associated parts are all the same as that previously described. Moreover, the control valve 44 has the same construction and mode of operation as that described above. The valve operator mechanism 82, 84, and 91, as well as the operator 94 and its vacuum control mechanisms 115, 123, and 140 are also the same as previously described. However, the control valve 62a and its operating mechanism are different from that shown in FIG. 1. The control valve 62a is a duplicate of the control valve 44, with the exception that the bypass orifice 60 is omitted, and also the shape of the valve surface 159 may not be the same as that of the surface 57. The stem 76a is mechanically operated by a lever 160 carried on hub 161 mounted to turn on stationary pin 162. The pin is carried on the stationary support arm 163. An opening 164 in the arm 160 loosely receives the upper projecting end of the stem 76a, and the rounded portion 165 of the arm 160 is engageable with the underside of the collar 166 attached to the stem 76a. A second crank arm 167 is fixed to the hub 161 and carries a pin 168. This pin is received in a slot 169 provided at one end of the rod 171. This rod 171 is pivotally connected at 172 to an arm 173 formed integrally with the arms 82 and 91.

Accordingly, counterclockwise movement of the arm 82 about the support pin 83 in a direction to open the control valve 44 first causes movement of the rod 171 with respect to the pin 168. When the movement of the rod 171 is sufficient to take up the clearance in the slot 169, the pin 168 and arm 167 are also moved in a counterclockwise direction to open the control valve 62a. From this description it will be understood that when the intensity of vacuum pressure in the chamber 101 is diminished, and when the throttle rod 38 is moved to the left, as viewed in FIG. 2, the arm 82 acts first to open the control valve 44 and the arm 160 later acts to open the control valve 62a.

Having fully described our invention, it is to be understood that we are not to be limited to the details herein set forth but that our invention is of the full scope of the appended claims.

We claim:

1. In an internal-combustion spark-ignition piston engine having a main combustion chamber and an auxiliary combustion chamber connected by a restricted torch nozzle, the combination of: means including an intake passage for supplying a lean mixture to the main combustion chamber, means including an intake passage for supplying a rich mixture to the auxiliary combustion chamber, a throttle valve in each of said intake passages, an exhaust passage leading from the main combustion chamber, means forming a conduit for conducting a portion of the exhaust gases to mix with rich mixture in the intake passage to the auxiliary combustion chamber, a control valve for controlling flow of exhaust gases through said conduit, means for operating said valve including a throttle member connected to operate said throttle valves, means including resilient means whereby said throttle member may act to open said control valve, and means responsive to vacuum pressure in one of said intake passages for modifying the operation of said control valve.

2. In an internal-combustion spark-ignition piston engine having a main combustion chamber and an auxiliary combustion chamber connected by a restricted torch nozzle, the combination of: means including an intake passage for supplying a lean mixture to the main combustion chamber, means including an intake passage for supplying a rich mixture to the auxiliary combustion chamber, a throttle valve in each of said intake passages, an exhaust passage leading from the main combustion chamber, means forming a conduit for conducting a portion of the exhaust gases to mix with rich mixture in the intake passage to the auxiliary combustion chamber, a control valve for controlling flow of exhaust gases through said conduit, means for operating said valve including a throttle member connected to operate said throttle valves, means including resilient means whereby said throttle member may act to open said control valve, means responsive to vacuum pressure in one of said intake passages for modifying the operation of said control valve, and means for forming a restricted orifice bypassing said control valve.

3. In an internal-combustion spark-ignition piston engine having a main combustion chamber and an auxiliary combustion chamber connected by a restricted torch nozzle, the combination of: means including a valve-controlled intake passage for supplying a lean mixture to the main combustion chamber, means including a valve-controlled intake passage for supplying a rich mixture to the auxiliary combustion chamber, a throttle valve in each of said intake passages, a valve-controlled exhaust passage leading from the main combustion chamber, means forming a conduit for conducting a portion of said exhaust gases to mix with rich mixture in the intake passage to the auxiliary combustion chamber, means for controlling flow of exhaust gases through said conduit, said means including a throttle member connected to operate said throttle valves, the flow control means comprising a valve, a second conduit for delivering exhaust gases to mix with the lean mixture in the intake passage for the main combustion chamber, and valve means for controlling flow of exhaust gases through said second conduit.

4. In an internal-combustion spark-ignition piston engine having a main combustion chamber and an auxiliary combustion chamber connected by a restricted torch nozzle, the combination of: means including a valve-controlled intake passage for supplying a lean mixture to the main combustion chamber, means including a valve-controlled intake passage for supplying a rich mixture to the auxiliary combustion chamber, a throttle valve in each of said intake passages, a valve-controlled exhaust passage leading from the main combustion chamber, means forming a conduit for conducting a portion of said exhaust gases to mix with rich mixture in the intake passage to the auxiliary combustion chamber, means forming a conduit for conducting a portion of said exhaust gases to mix with lean mixture in the intake passage to the main combustion chamber, means for controlling flow of exhaust gases through said conduit, said means including a throttle member connected to operate said throttle valves, a separate control valve mounted in each of said conduits, means for holding both valves in closed position when the engine is idling, and means including a lost-motion connection for opening the control valve for the rich mixture intake passage before opening the control valve for the lean mixture intake passage, as the load on the engine increases.

5. In an internal-combustion spark-ignition piston engine having a main combustion chamber and an auxiliary combustion chamber connected by a restricted torch nozzle, the combination of: means including a first valve-controlled intake passage for supplying a rich mixture to the auxiliary combustion chamber, means including a second valve-controlled intake passage for supplying a lean mixture to the main combustion chamber, a valve-controlled exhaust passage leading from the main combustion chamber, means forming a first conduit for conducting a portion of the exhaust gases to mix with the rich mixture in said first intake passage, means forming a second conduit for conducting a portion of the exhaust gases to mix with the lean mixture in said second intake passage, a first control valve in said first conduit, a second control valve in said second conduit, and coordinated means for separately operating each of said control valves.

6. The combination set forth in claim 5 including means responsive to vacuum pressure in one of said intake passages for closing the control valve in said first conduit.

7. The combination set forth in claim 6 in which means are provided for forming a restricted orifice bypassing the control valve in said first conduit.

8. The combination set forth in claim 5 in which throttle valves are provided to control the delivery of separate air-fuel mixtures to said intake passages, a throttle member connected to operate said throttle valves, and means including resilient means whereby said throttle member may act to open said control valve in said first conduit.

9. In an internal-combustion spark-ignition piston engine having a main combustion chamber and an auxiliary combustion chamber connected by a restricted torch nozzle, the combination of: means including a first valve-controlled intake passage for supplying a rich mixture to the auxiliary combustion chamber, means including a second valve-controlled intake passage for supplying a lean mixture to the main combustion chamber, a throttle valve in each of said intake passages, a valve-controlled exhaust passage leading from the main combustion chamber, means including a first conduit for conducting a portion of the exhaust gases to mix with the rich mixture in said first intake passage, means forming a second conduit for conducting a portion of the exhaust gases to mix with the lean mixture in said second intake passage, a first control valve in said first conduit, a second control valve in said second conduit, a throttle member connected to operate said throttle valves, means including resilient means whereby said throttle member may act to open said control valve in said first conduit, and means responsive to vacuum pressure in one of said intake passages for modifying the operation of the control valve in said first conduit.

10. The combination set forth in claim 9 in which the vacuum responsive means acts to hold both control valves in closed position when the engine is idling.

11. The combination set forth in claim 9 in which said second control valve is operated by vacuum pressure.

12. The combination set forth in claim 9 in which said second control valve is operated mechanically through a lost-motion connection from said throttle member.

13. The method of operating an internal-combustion spark-ignition piston engine having a main combustion chamber and an auxiliary combustion chamber connected by a restricted torch nozzle, comprising the steps of: supplying a lean mixture to the main combustion chamber, supplying a rich mixture to the auxiliary combustion chamber, compressing the mixtures in both chambers, spark-igniting the mixture in the auxiliary chamber to produce a flame extending through the torch nozzle to ignite and burn the mixture in the main chamber, recycling exhaust gases from the main chamber to mix with the rich mixture being supplied to the auxiliary chamber, and recycling a portion of the exhaust gases to mix with the lean mixture being supplied to the main combustion chamber.

14. The method of operating an internal-combustion spark-ignition piston engine having a main combustion chamber and an auxiliary combustion chamber connected by a restricted torch nozzle, comprising the steps of: supplying a lean mixture to the main combustion chamber, supplying a rich mixture to the auxiliary combustion chamber, compressing the mixtures in both chambers, spark-igniting the mixture in the auxiliary chamber to produce a flame extending through the torch nozzle to ignite and burn the mixture in the main chamber, recycling exhaust gases from the main chamber to mix with the rich mixture being supplied to the auxiliary chamber, recycling a portion of the exhaust gases to mix with the lean mixture being supplied to the main combustion chamber, and employing the latter said recycling step only under certain load operating conditions of the engine.

15. The combination set forth in claim 5 in which a throttle valve is provided to control the delivery of lean air-fuel mixture to said second intake passage, a throttle member connected to operate said throttle valve, and means including resilient means whereby said throttle member may act to open said control valve in said first conduit.

16. In an internal-combustion spark-ignition piston engine having a main combustion chamber annd an auxiliary combustion chamber connected by a restricted torch nozzle, the combination: means including a first valve-controlled intake passage for supplying a rich mixture to the auxiliary combustion chamber, means including a second valve-controlled intake passage for supplying a lean mixture to the main combustion chamber, a throttle valve in the lean mixture intake passage, a valve-controlled exhaust passage leading from the main combustion chamber, means including a first conduit for conducting a portion of the exhaust gases to mix with the rich mixture in said first intake passage, means forming a second conduit for conducting a portion of the exhaust gases to mix with the lean mixture in said second intake passage, a first control valve in said first conduit, a second control valve in said second conduit, a throttle member connected to operate said throttle valve, means including resilient means whereby said throttle member may act to open said control valve in said first conduit, and means responsive to vacuum pressure in one of said intake passages for modifying the operation of the control valve in said first conduit.

17. In an internal-combustion spark-ignition piston engine having a main combustion chamber and an auxiliary combustion chamber connected by a restricted torch nozzle, the combination of: means including a valve-controlled intake passage for supplying a lean mixture to the main combustion chamber, means including a valve controlled intake passage for supplying a rich mixture to the auxiliary combustion chamber, a throttle valve in the lean mixture intake passage, a valve-controlled exhaust passage leading from the main combustion chamber, means forming a conduit for conducting a portion of said exhaust gases to mix with rich mixture in the intake passage to the auxiliary combustion chamber, a control valve in the conduit for controlling flow of exhaust gases therethrough, means for operating said control valve including a throttle member connected to operate said throttle valve, means responsive to vacuum pressure in one of said intake passages for modifying the operation of said control valve, the latter said means also serving to prevent too rapid movement of the operating means in one direction in the absence of vacuum pressure.

* * * * *